US010237133B2

United States Patent
Rani et al.

(10) Patent No.: US 10,237,133 B2
(45) Date of Patent: Mar. 19, 2019

(54) TECHNIQUES OF RESTORING BMC CONFIGURATIONS TO MULTIPLE BMCS

(71) Applicant: American Megatrends, Inc., Norcross, GA (US)

(72) Inventors: A. Arockia Selva Rani, Chennai (IN); Venkatesan Balakrishnan, Chennai (IN); Senguttuvan Marimuthu, Chennai (IN); Maheswari Alagarsamy, Madurai (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 222 days.

(21) Appl. No.: 15/272,991

(22) Filed: Sep. 22, 2016

(65) Prior Publication Data

US 2018/0083834 A1    Mar. 22, 2018

(51) Int. Cl.
*H04L 12/24*    (2006.01)
*H04L 29/08*    (2006.01)

(52) U.S. Cl.
CPC ...... *H04L 41/0846* (2013.01); *H04L 41/0213* (2013.01); *H04L 67/1097* (2013.01)

(58) Field of Classification Search
USPC ........................................ 709/221, 200, 223
See application file for complete search history.

(56) References Cited

U.S. PATENT DOCUMENTS

2014/0310246 A1* 10/2014 Vijayan ............... G06F 11/1469
707/679
2017/0131991 A1* 5/2017 Su .......................... G06F 8/665

* cited by examiner

Primary Examiner — El Hadji M Sall
(74) Attorney, Agent, or Firm — Locke Lord LLP; Tim Tingkang Xia, Esq.

(57) ABSTRACT

In an aspect of the disclosure, a method, a computer-readable medium, and a computer system are provided. The computer system may include a first embedded-system device and a second embedded-system device. The first embedded-system device receives a first message instructing the first embedded-system device to make configurations of the first embedded-system device available at a location in a network. The first embedded-system device makes the configurations available at the location. The second embedded-system device obtains a subset of the configurations made available at the location. The second embedded-system device restores itself with the subset of the configurations.

17 Claims, 7 Drawing Sheets

TECHNIQUES OF RESTORING BMC CONFIGURATIONS TO MULTIPLE BMCS

BACKGROUND

Field

The present disclosure relates generally to embedded-system devices, and more particularly, to techniques of restoring configurations of a particular baseboard management controller (BMC) to multiple BMCs.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

A data center may run a large number of BMCs to manage the servers of the data center. Traditionally, an administrator may need to configure each BMC manually one by one, which is tedious and time consuming. Thus, there is a need for a mechanism that can restore configurations of a particular BMC to multiple BMCs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system may include a first embedded-system device and a second embedded-system device. The first embedded-system device receives a first message instructing the first embedded-system device to make configurations of the first embedded-system device available at a location in a network. The first embedded-system device makes the configurations available at the location. The second embedded-system device obtains a subset of the configurations made available at the location. The second embedded-system device restores itself with the subset of the configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
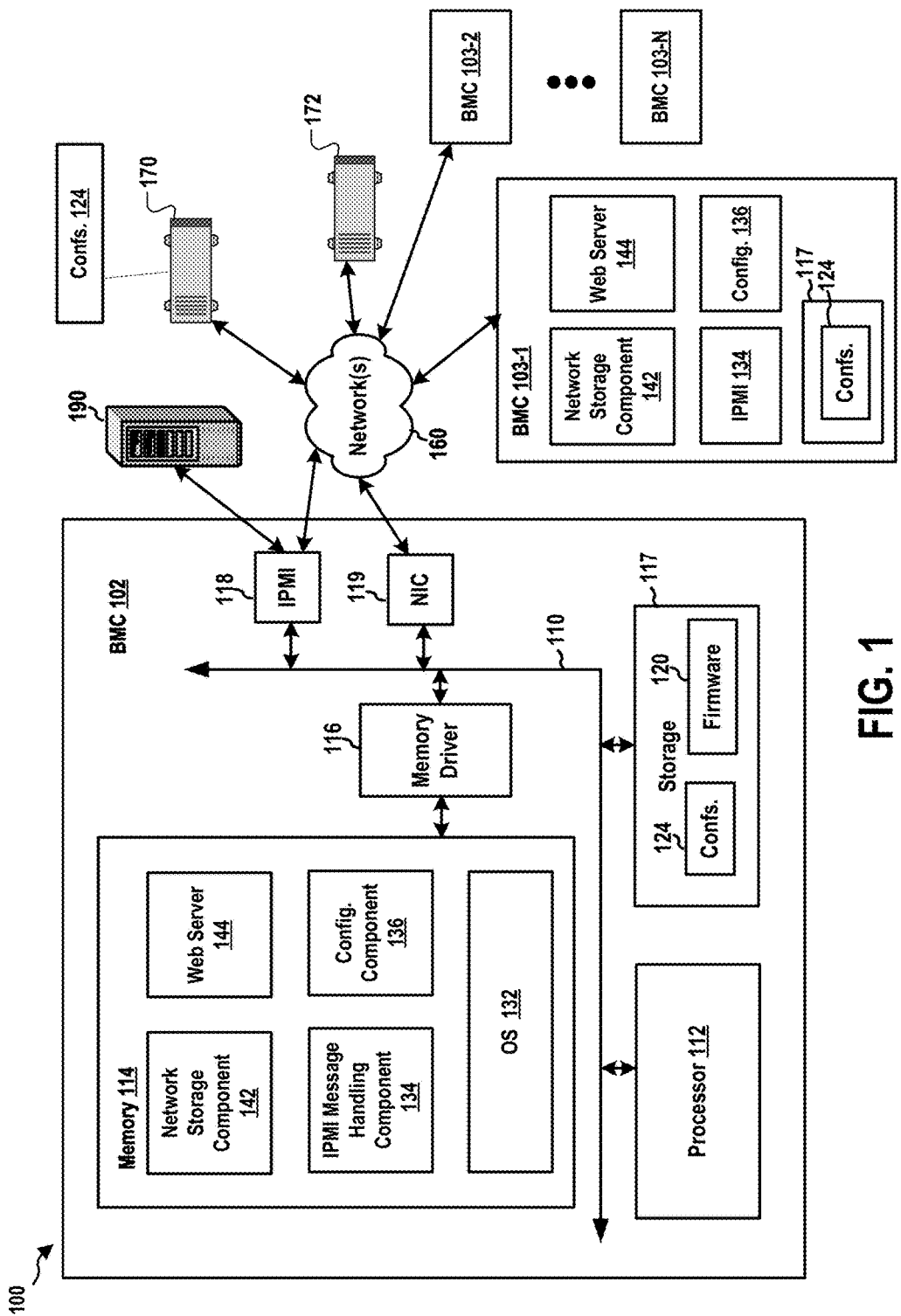
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A data center may run a large number of BMCs to manage the servers of the data center. Traditionally, an administrator may need to configure each BMC manually one by one, which is tedious and time consuming. Thus, there is a need for a mechanism that can restore configurations of a particular BMC (e.g., manually configured) to multiple BMCs.

FIG. 1 is a diagram 100 illustrating a computer system. In this example, the computer system includes, among other devices, a BMC 102, BMCs 103-1 . . . 103-N, a host computer 190, a network device 170, and a remote device 172. The BMC 102 has a processor 112, a memory 114, a memory driver 116, a storage 117, and a network interface card 119. Further, the BMC 102 may support IPMI and may have an IPMI interface 118. The IPMI interface 118 may be implemented over a keyboard controller style (KCS), a server management interface chip (SMIC), a block transfer (BT) interface, a system management bus system interface (SSIF), a Universal Serial Bus (USB) interface, a network interface (e.g., the network interface card 119), and/or other suitable communication interface(s). The memory 114, the processor 112, the memory driver 116, the storage 117, the network interface card 119, and the IPMI interface 118 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, an IPMI message handling component 134, a network storage component 142, and a web server 144. The IPMI message handling component 134 may receive and send IPMI messages through the IPMI interface 118.

The BMC 102 may be configured by a user. In particular, the user may (e.g., use the remote device 172 over the network 160 to) input various configuration parameters (e.g., the user accounts used to access the BMC 102, sensor configurations, IPMI configurations, etc.) to set up (or initialize, restore) the BMC 102. The BMC 102 may store configuration files 124 carrying those configuration parameters in the storage 117. In particular, the configuration files 124 may be stored in a dedicated folder in the storage 117.

The BMC 102 may be in communication, through one or more of the communication interface described supra and/or through the IPMI interface 118, with the host computer 190 and/or a network device 170. The BMC may manage the host computer 190.

The communications between the BMC 102 and the network device 170 may be carried over a network 160. The network device 170 may support Network File System (NFS) protocol (or other networked file storage protocols), and may be mounted to another device and may function as an NFS file storage. In this example, the BMC 102 may be in communication with the network 160 through the network interface card 119. The network storage component 142 at the BMC 102 may mount, via the network interface card 119, the network device 170 to the file system of the BMC 102 and use the network device 170 as an NFS file storage.

Further, each of the BMCs 103-1 . . . 103-N may be similar to the BMC 102. Each of the BMCs 103-1 . . . 103-N may have similar components, including an IPMI message handling component 134, a configuration component 136, a network storage component 142, a web server 144. Each of the BMCs 103-1 . . . 103-N may store its configuration files 124 in a storage 117. Each of the BMCs 103-1 . . . 103-N may manage a host similar to the host computer 190.

Figure 2:
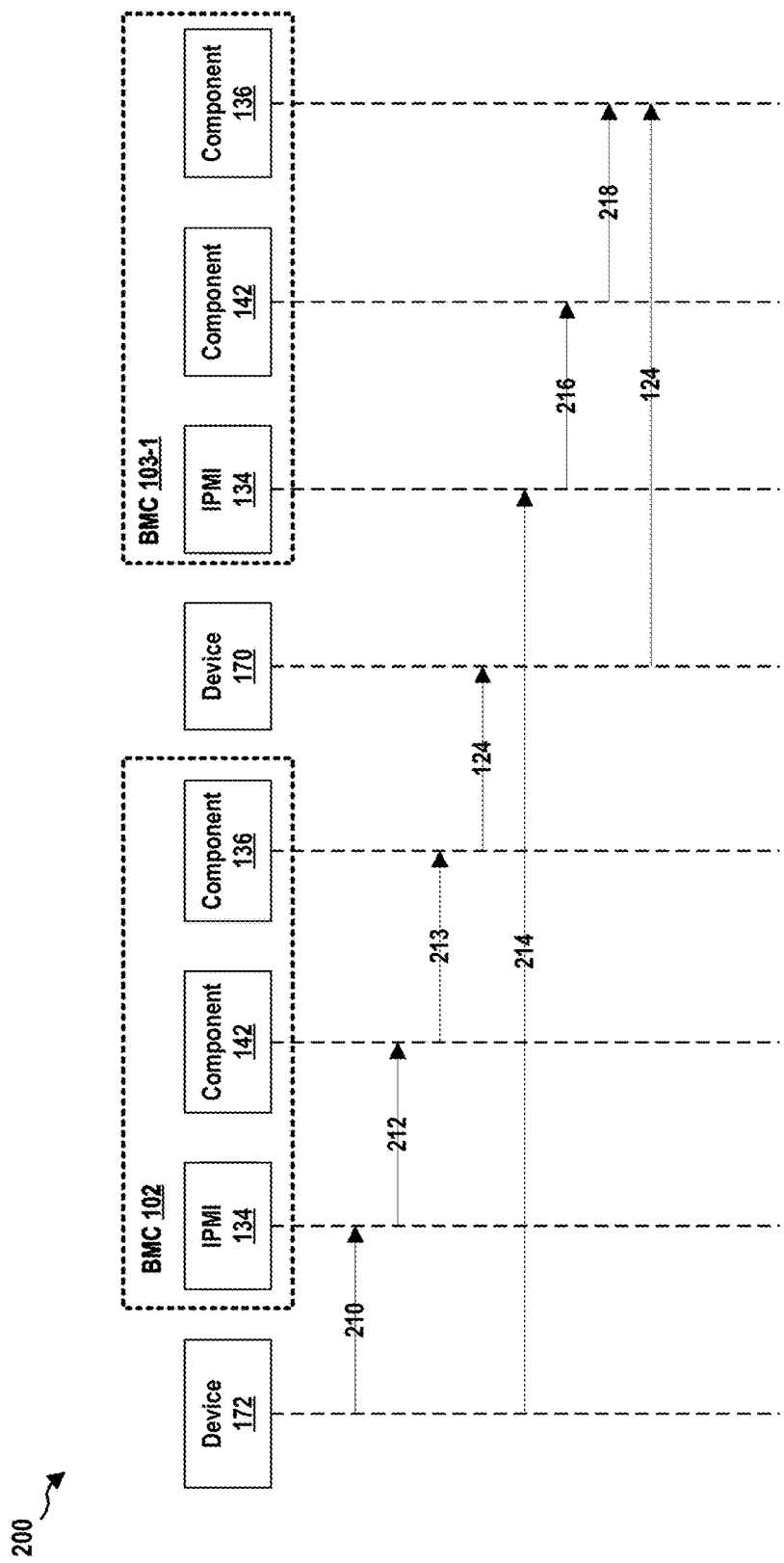
FIG. 2 is a diagram illustrating a sequence of operations for configuring a BMC.

FIG. 2 is a diagram 200 illustrating a sequence of operations for configuring a BMC (e.g., the BMC 103-1). In this first configuration, after the BMC 102 has stored the configuration files 124 in the storage 117, the IPMI message handling component 134 may receive an IPMI message requesting the BMC 102 to copy the configuration files 124 to the network device 170. Each of the IPMI messages described in the present disclosure may be a customized IPMI message (e.g., an IPMI OEM message). In this example, the remote device 172, e.g., under the instructions of a user, may send an IPMI message 210 to the IPMI message handling component 134 at the BMC 102. The IPMI message 210 indicates the location of the network device 170 and instructs the BMC 102 to copy the configuration files 124 to the network device 170. The IPMI message 210 may indicate the network storage protocol (e.g., NFS file storage protocol) to be used. The IPMI message 210 may also indicate a particular folder of the network device 170 for storing the configuration files 124. In this example, the IPMI message 210 also includes the NFS configurations for mounting the network device 170.

The IPMI message handling component 134 at the BMC 102 receives the IPMI message 210 and extracts the indications from the IPMI message 210. Then, the IPMI message handling component 134 sends an instruction 212 to the network storage component 142. The instruction 212 includes the location and folder of the network device 170 as well as the NFS configurations as indicated in the IPMI message 210. The instruction 212 also instructs the network storage component 142 to mount the network device 170 to the BMC 102.

Accordingly, the network storage component 142 mounts the network device 170 to the BMC 102 based on the NFS configurations. The network device 170 now functions as a storage device of the BMC 102. The network storage component 142 then sends an instruction 213 to the configuration component 136, indicating that the network device 170 has been mounted to the BMC 102. The instruction 213 may also instruct the configuration component 136 to copy the configuration files 124 to the network device 170. (Alternatively, the IPMI message handling component 134 may instruct the configuration component 136 to copy the configuration files 124 to the network device 170.) The configuration component 136 then copies the configuration files 124 to the network device 170. The configuration component 136 may also instruct the network device 170 to store the configuration files 124 in the particular folder that was indicated in the IPMI message 210. The network storage component 142 then unmounts the network device 170. The network device 170 accordingly stored the configuration files 124.

Subsequently, the BMC 103-1 may receive an IPMI message. In this example, the remote device 172, e.g., under the instructions of a user, may send an IPMI message 214 to the IPMI message handling component 134 at the BMC 103-1. The IPMI message 214 instructs the BMC 103-1 to retrieve a subset of the configuration files 124 from the network device 170 and to accordingly set up the BMC 103-1. The subset may include some or all of the configuration files 124.

The IPMI message 214 indicates the location of the network device 170 and instructs the BMC 103-1 to copy the subset of the configuration files 124 from the network device 170. The IPMI message 214 may also indicate the network storage protocol (e.g., NFS file storage protocol) to be used. The IPMI message 214 may further indicate a particular folder of the network device 170 that stores the configuration files 124. In this example, the IPMI message 214 also includes the NFS configurations for mounting the network device 170.

The IPMI message handling component 134 at the BMC 103-1 receives the IPMI message 214 and extracts the indications from the IPMI message 214. Then, the IPMI message handling component 134 send an instruction 216 to the network storage component 142 of the BMC 103-1. The instruction 216 includes the location and folder of the network device 170 as well as the NFS configurations as indicated in the IPMI message 214. The instruction 216 instructs the network storage component 142 to mount the network device 170 to the BMC 103-1.

Accordingly, the network storage component 142 mounts the network device 170 to the BMC 103-1 based on the NFS configurations. The network storage component 142 then sends an instruction 218 to the configuration component 136, indicating that the network device 170 has been mounted to the BMC 102. The instruction 218 may also instruct the configuration component 136 to copy the configuration files 124 from the network device 170. (Alternatively, the IPMI message handling component 134 may instruct the configuration component 136 to copy the configuration files 124 from the network device 170.) The configuration component 136 then retrieves the subset of the configuration files 124 from the particular folder at the network device 170 that was indicated in the IPMI message 214.

The configuration component 136 of the BMC 103-1 then may request the BMC 103-1 to transition to a prepare-flash-area mode. For example, the configuration component 136 may issue a dummy flash command. When the BMC 103-1 is in the prepare-flash-area mode, processes of the BMC 103-1 other than those of the configuration component 136 may be prohibited from updating configurations of the BMC 103-1. While the BMC 103-1 is in the prepare-flash-area mode, the configuration component 136 updates (or overwrites) corresponding configurations of the BMC 103-1 with the retrieved subset of configuration files 124 of the BMC 102. The network storage component 142 then unmounts the network device 170. The configuration component 136 may instruct the BMC 103-1 to reboot. As such, the BMC 103-1 subsequently starts operating with the updated configurations.

As described supra in this first configuration, the BMC 103-1 has been restored (configured) based on the configuration files 124 of the BMC 102. Further, the other BMCs of the BMCs 103-1 . . . 103-N may also be similarly configured.

Figure 3:
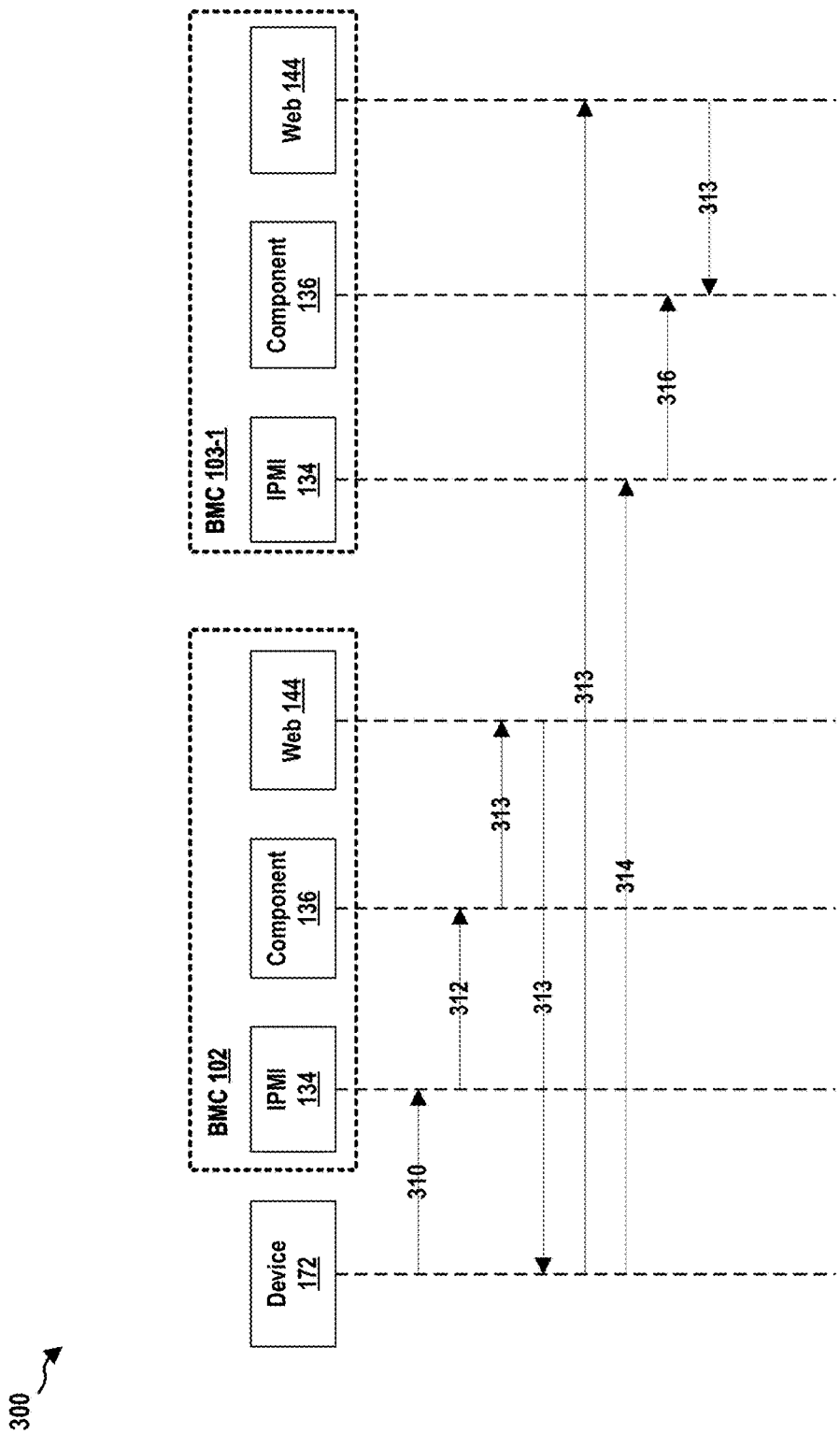
FIG. 3 is a diagram illustrating another sequence of operations for configuring a BMC.

FIG. 3 is a diagram 300 illustrating another sequence of operations for configuring a BMC (e.g., the BMC 103-1). In this first configuration, after the BMC 102 has stored the configuration files 124 in the storage 117, the IPMI message handling component 134 may receive an IPMI message requesting the BMC 102 to make the configuration files 124 available at the web server 144 of the BMC 102. For example, the remote device 172, e.g., under the instructions of a user, may send an IPMI message 310 to the IPMI message handling component 134 at the BMC 102. The IPMI message 310 instructs the BMC 102 to package the configuration files 124 into a data collection 313 (e.g., a tar/zip file) and make the data collection 313 available at the web server 144. The IPMI message 310 may also indicate a particular folder, at a location of the web server 144, that is used for storing the data collection 313.

The IPMI message handling component 134 at the BMC 102 receives the IPMI message 310 and extracts the indications from the IPMI message 310. The IPMI message handling component 134 sends an instruction 312 to the configuration component 136. In this example, the instruction 312 instructs the configuration component 136 to package the configuration files 124 into the data collection 313 (e.g., to compress the configuration files 124 into a tar/zip file). The instruction 312 may include the location and folder of the web server 144 for placing the data collection 313.

Accordingly, the configuration component 136 packages the configuration files 124 into a data collection 313 (e.g., a tar/zip file). Subsequently, the configuration component 136 places the data collection 313 at the location/folder of the web server 144 of the BMC 102.

The remote device 172, e.g., under the instructions of a user, downloads the data collection 313 from the web server 144 of the BMC 102. Then the remote device 172 uploads the data collection 313 to the BMC 103-1 through the web server 144 of the BMC 103-1.

Subsequently, the BMC 103-1 may receive an IPMI message requesting the BMC 103-1 to restore the BMC 103-1 based on the uploaded configurations. In this example, the remote device 172, e.g., under the instructions of a user, may send an IPMI message 314 to the IPMI message handling component 134 at the BMC 103-1. The IPMI message 314 instructs the BMC 103-1 to retrieve a subset of the configuration files 124 from the data collection 313 uploaded to the BMC 103-1 through the web server 144 of the BMC 103-1. The IPMI message 314 indicates the location and/or a particular folder of the web server 144 that stores the data collection 313 uploaded. The IPMI message 314 may also instruct the BMC 103-1 to set up itself using the subset of the configuration files 124. The subset may include some or all of the configuration files 124.

The IPMI message handling component 134 at the BMC 103-1 receives the IPMI message 314 and extracts the indications from the IPMI message 314. Then, the IPMI message handling component 134 sends an instruction 316 to the configuration component 136 of the BMC 103-1. The instruction 316 instructs the configuration component 136 to retrieve the subset from the data collection 313. The instruction 316 includes the location and folder of the web server 144 at where the data collection 313 is placed.

Accordingly, the configuration component 136 retrieves data collection 313 from the particular location/folder at the web server 144 that was indicated in the IPMI message 310. As described supra, in this example, the data collection 313 is a tar/zip file. The configuration component 136 decompresses the tar/zip file at a temporary location. That is, the configuration files 124 are now placed at the temporary location. Then the configuration component 136 retrieves, from the temporary location, the subset of the configuration files 124 as indicated in the IPMI message 314.

The configuration component 136 of the BMC 103-1 then requests the BMC 103-1 to transition to a prepare-flash-area mode. For example, the configuration component 136 may issue a dummy flash command. When the BMC 103-1 is in the prepare-flash-area mode, processes of the BMC 103-1 other than those of the configuration component 136 may be prohibited from updating configurations of the BMC 103-1. While the BMC 103-1 is in the prepare-flash-area mode, the configuration component 136 updates (or overwrites) corresponding configurations of the BMC 103-1 with the retrieved subset of configuration files 124 of the BMC 102. The configuration component 136 may instruct the BMC 103-1 to reboot. As such, the BMC 103-1 subsequently starts operating with the updated configurations.

As described supra in this second configuration, the BMC 103-1 has been restored (configured) based on the configuration files 124 of the BMC 102. Further, the other BMCs of the BMCs 103-1 . . . 103-N may also be similarly configured.

Figure 4:
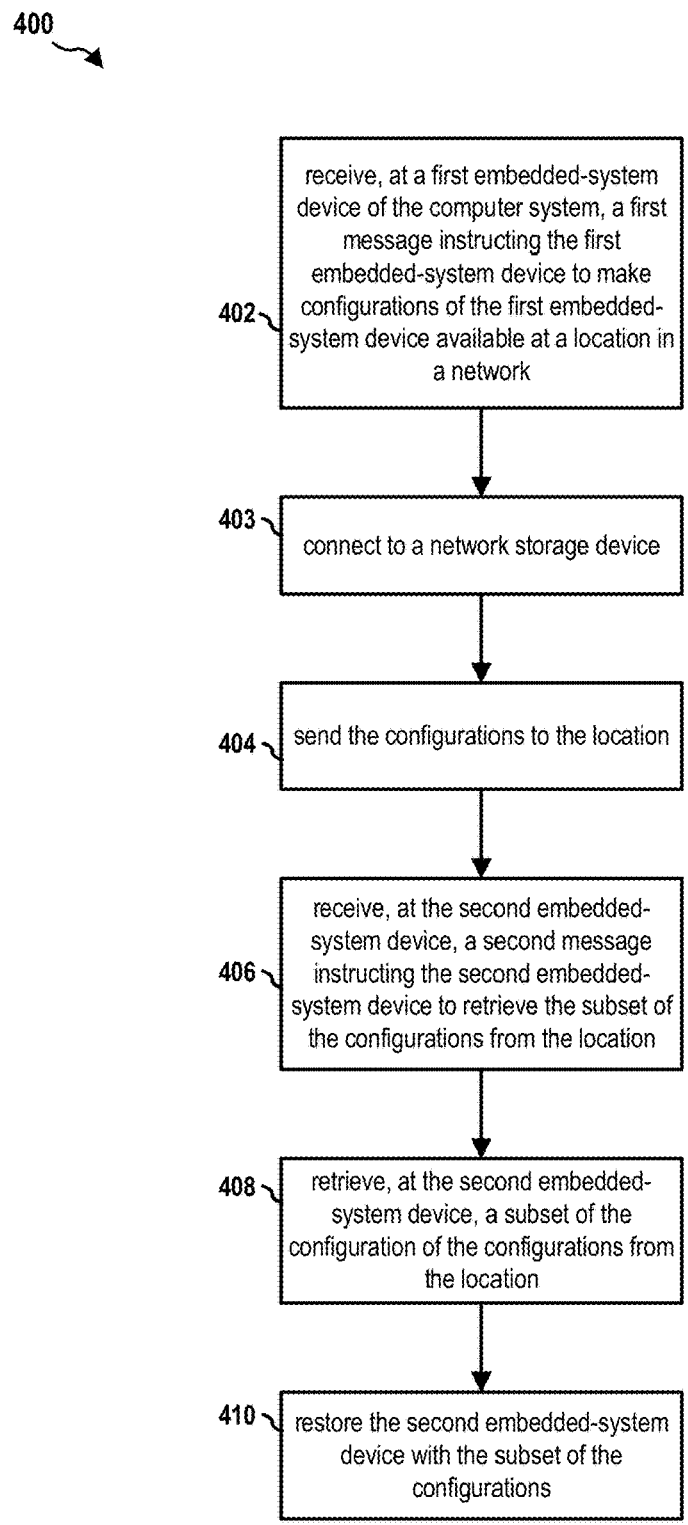
FIG. 4 is a flow chart of a method (process) for restoring configurations.

FIG. 4 is a flow chart 400 of a method (process) for restoring configurations. The method may be performed by a first embedded-system device (e.g., the BMC 102, the apparatus 102') and a second embedded-system device (e.g., each of the BMCs 103-1 . . . 103-N, the apparatus 102') of a computer system.

At operation 402, the first embedded-system device (e.g., via the IPMI message handling component 134) receives a first message (e.g., the IPMI message 210) instructing the first embedded-system device to make configurations (e.g., the configuration files 124) of the first embedded-system device available at a location in a network. The first embedded-system device then makes the configurations available at the location. More specifically, in certain configurations, the location is at a network storage device (e.g., the network device 170). At operation 403, the first embedded-system device connects to the network storage device. At operation 404, the first embedded-system device sends the configurations to the location.

Subsequently, the second embedded-system device obtains a subset of the configurations made available at the location. More specifically, at operation 406, the second embedded-system device (e.g., via the IPMI message handling component 134) receives a second message (e.g., the IPMI message 214) instructing the second embedded-system device to retrieve the subset of the configurations from the location. At operation 408, the second embedded-system device retrieves the subset of the configurations from the location. At operation 410, the second embedded-system device restores (sets up) the second embedded-system device with the subset of the configurations.

Figure 5:
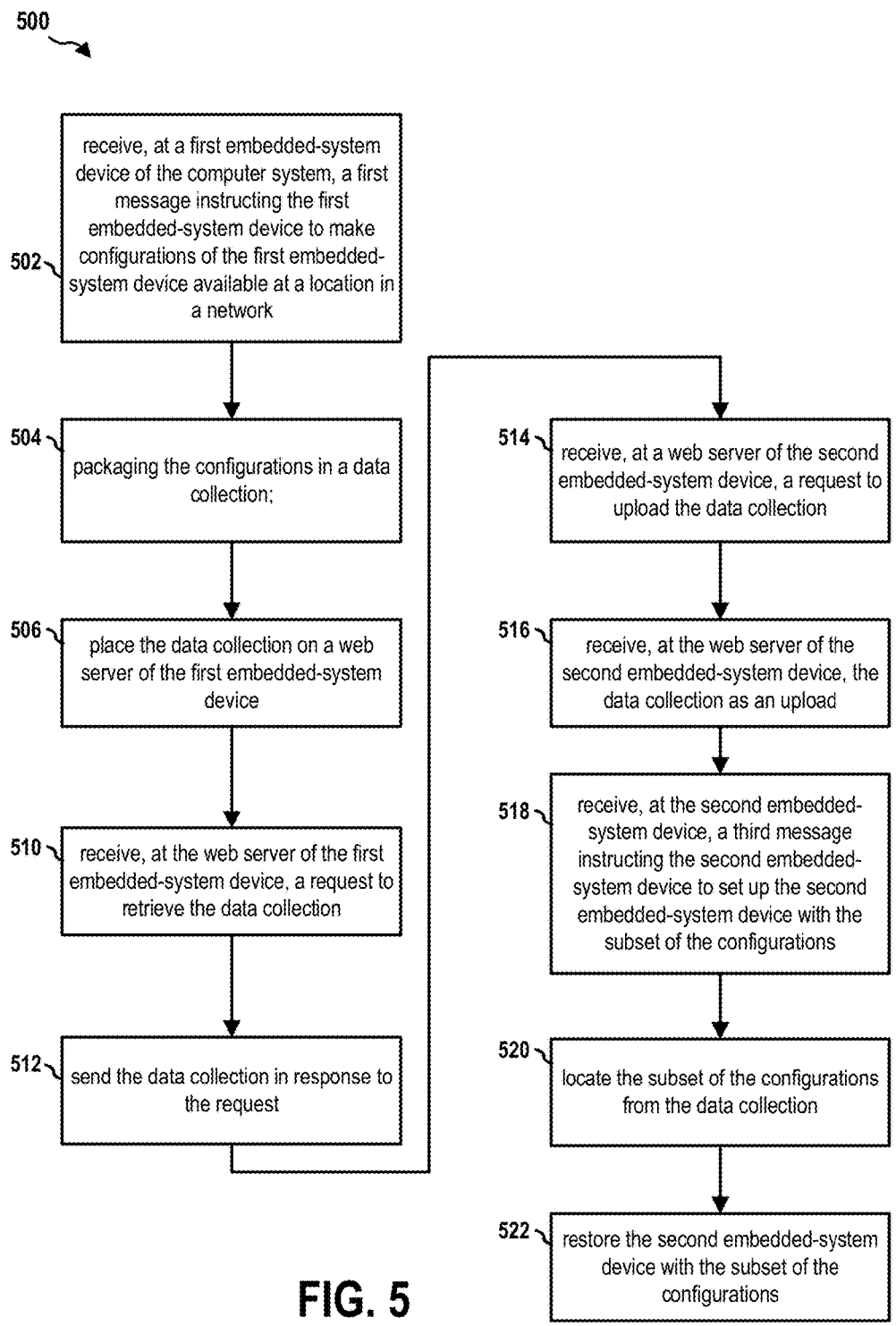
FIG. 5 is a flow chart of another method (process) for restoring configurations.

FIG. 5 is a flow chart 500 of another method (process) for restoring configurations. The method may be performed by a first embedded-system device (e.g., the BMC 102, the apparatus 102') and a second embedded-system device (e.g., each of the BMCs 103-1 . . . 103-N, the apparatus 102') of a computer system.

At operation 502, the first embedded-system device (e.g., via the IPMI message handling component 134) receives a first message (the IPMI message 310) instructing the first embedded-system device to make configurations (the configuration files 124) of the first embedded-system device available at a location in a network.

The first embedded-system device then makes the configurations available at the location. More specifically, in certain configurations, the location is at a web server (e.g., the web server 144) of the first embedded-system device. At operation 504, the first embedded-system device packages the configurations in a data collection (e.g., the data collection 313). At operation 506, the first embedded-system device places the data collection on the web server of the first embedded-system device. At operation 510, the web server of the first embedded-system device receives a request to retrieve the data collection. At operation 512, the web server sends the data collection in response to the request. For example, referring to FIG. 3, the remote device 172 downloads the data collection 313 from the web server 144 of the BMC 102.

Subsequently, the second embedded-system device obtains a subset of the configurations made available at the location. More specifically, at operation 514, a web server (e.g., the web server 144) of the second embedded-system device receives a request to upload the data collection. At operation 516, the web server of the second embedded-system device receives the data collection as an upload. For example, referring to FIG. 3, the remote device 172 uploads the data collection 313 to the BMC 103-1 through the web server 144 of the BMC 103-1. At operation 518, the second embedded-system device receives a third message (e.g., the IPMI message 314) instructing the second embedded-system device to restore the second embedded-system device with the subset of the configurations. At operation 520, the second embedded-system device locates the subset of the configurations from the data collection. At operation 522, the second embedded-system device restores (sets up) itself with the subset of the configurations.

Figure 6:
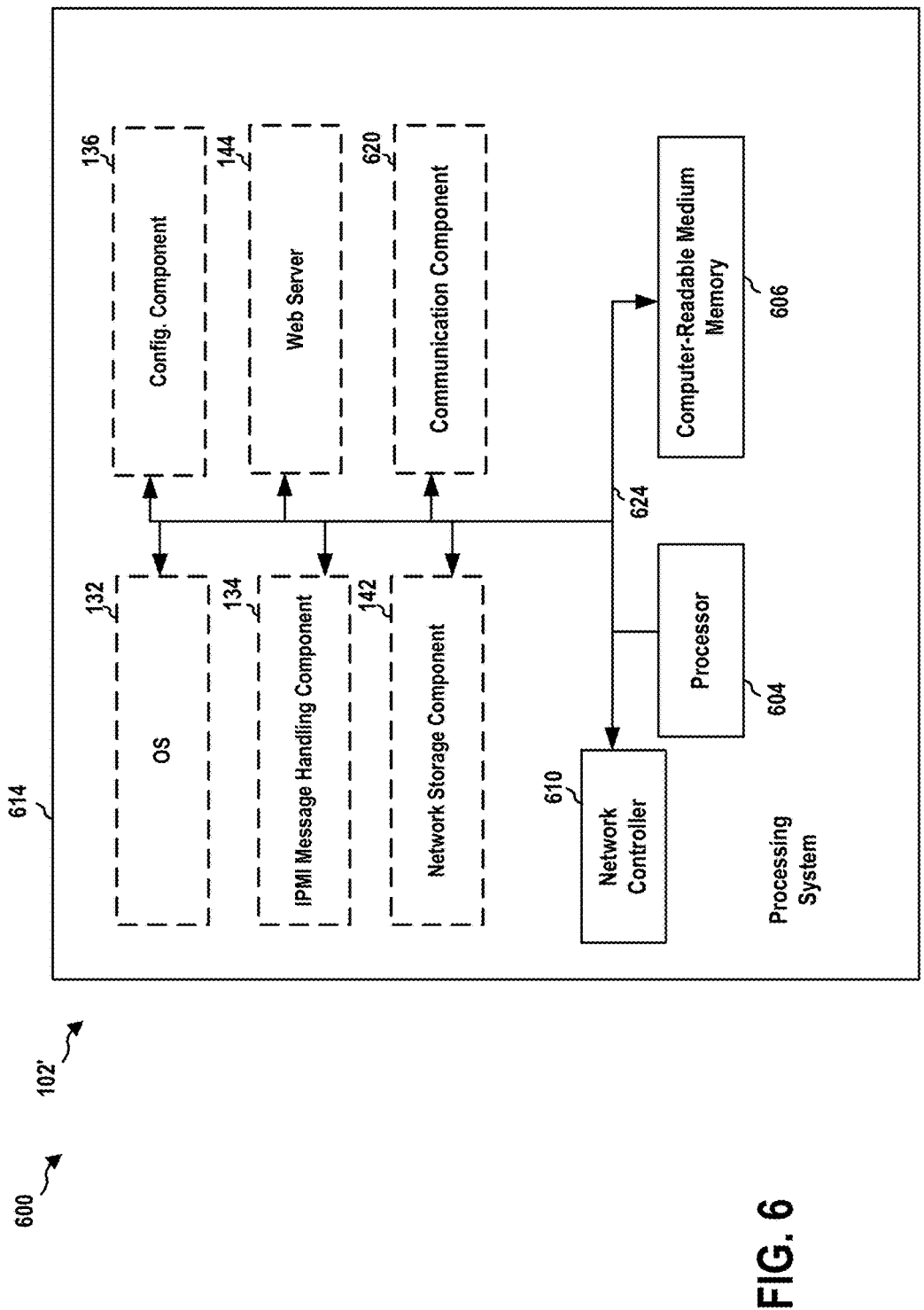
FIG. 6 is a diagram illustrating an example of a hardware implementation for an apparatus employing a processing system.

FIG. 6 is a diagram 600 illustrating an example of a hardware implementation for an apparatus 102' employing a processing system 614. The apparatus 102' may implement the BMC 102 and the BMCs 103-1 . . . 103-N. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the OS 132, the IPMI message handling component 134, the configuration component 136, the network storage component 142, the web server 144, and the computer-readable medium/memory 606. In particular, the computer-readable medium/memory 606 may include the memory 114 and the storage 117. The bus 624 may also link various other circuits such as timing sources, peripherals, voltage regulators, and power management circuits, which are well known in the art, and therefore, will not be described any further.

The processing system 614 may be coupled to a network controller 610. The network controller 610 provides a means for communicating with various other apparatus over a network. The network controller 610 receives a signal from the network, extracts information from the received signal, and provides the extracted information to the processing system 614, specifically a communication component 620 of the apparatus 102'. In addition, the network controller 610 receives information from the processing system 614, specifically the communication component 620, and based on the received information, generates a signal to be sent to the network. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the OS 132, the IPMI message handling component 134, the configuration component 136, the network storage component 142, the web server 144. The components may be software components running in the processor 604, resident/stored in the computer readable medium/memory 606, one or more hardware components coupled to the processor 604, or some combination thereof.

The apparatus 102' may be configured to include means for performing certain operations described supra referring to FIGS. 4-5. The aforementioned means may be one or more of the aforementioned components of the apparatus 102' and/or the processing system 614 of the apparatus 102' configured to perform the functions recited by the aforementioned means.

Figure 7:
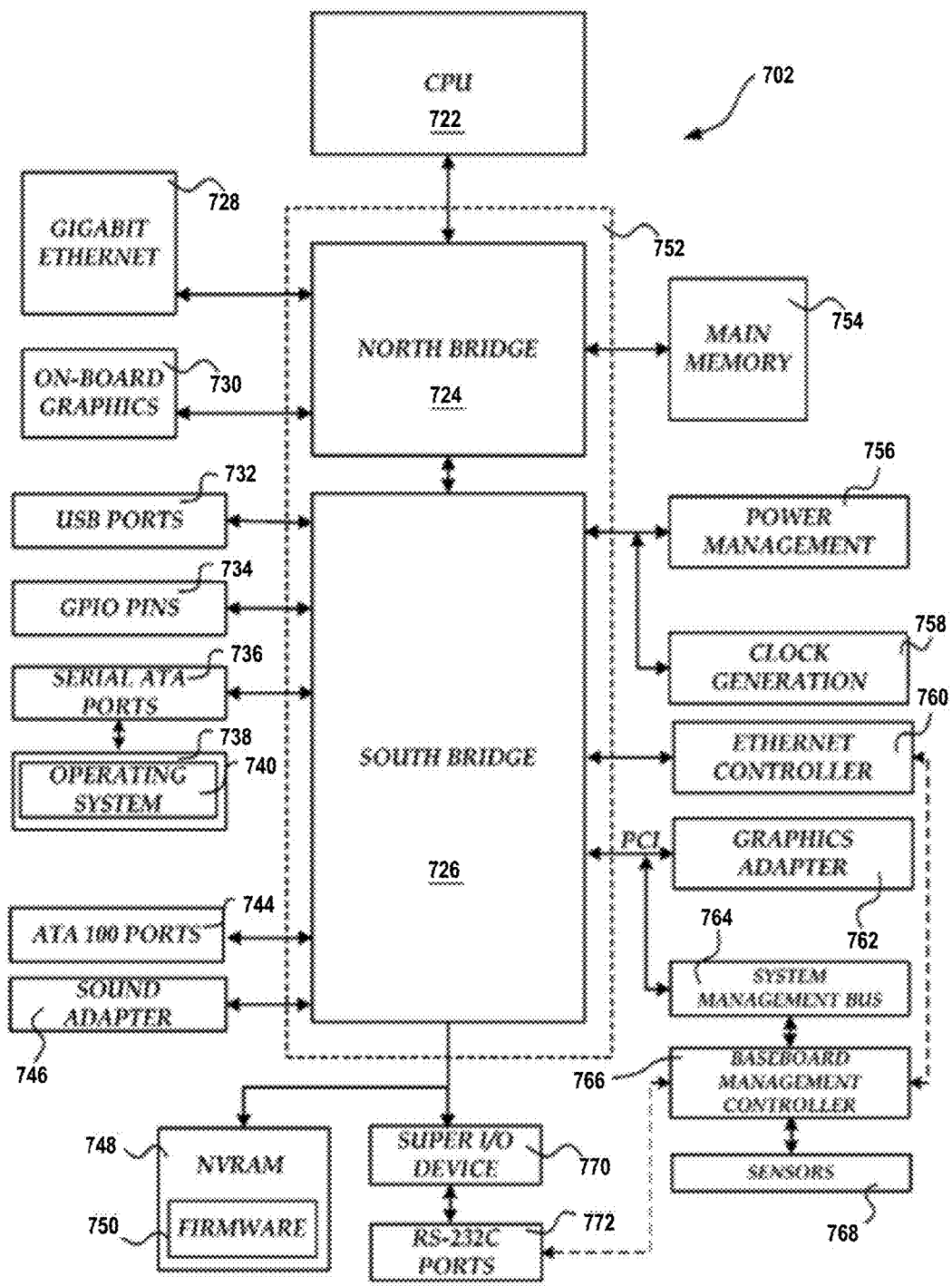
FIG. 7 shows a computer architecture for a computer.

FIG. 7 and the following discussion are intended to provide a brief, general description of one suitable computing environment in which aspects of the embodiments described herein may be implemented. In particular, FIG. 7 shows a computer architecture for a computer 702 that may be utilized to embody the host computer 190, as described supra. It should be appreciated that the computer architecture shown in FIG. 7 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 702 shown in FIG. 7 includes a baseboard, or "motherboard," which is a printed circuit board to which a multitude of components or devices may be connected by way of a system bus or other electrical communication path.

In one illustrative embodiment, a CPU 722 operates in conjunction with a chipset 752. The CPU 722 is a standard central processor that performs arithmetic and logical operations necessary for the operation of the computer. The server computer 702 may include a multitude of CPUs 722.

The chipset 752 includes a north bridge 724 and a south bridge 726. The north bridge 724 provides an interface between the CPU 722 and the remainder of the computer 702. The north bridge 724 also provides an interface to a random access memory ("RAM") used as the main memory 754 in the computer 702 and, possibly, to an on-board graphics adapter 730. The north bridge 724 may also include functionality for providing networking functionality through a gigabit Ethernet adapter 728. The gigabit Ethernet adapter 728 is capable of connecting the computer 702 to another computer via a network. Connections which may be made by the network adapter 728 may include LAN or WAN connections. LAN and WAN networking environments are commonplace in offices, enterprise-wide computer networks, intranets, and the internet. The north bridge 724 is connected to the south bridge 726.

The south bridge 726 is responsible for controlling many of the input/output functions of the computer 702. In particular, the south bridge 726 may provide one or more USB ports 732, a sound adapter 746, an Ethernet controller 760, and one or more GPIO pins 734. The south bridge 726 may also provide a bus for interfacing peripheral card devices such as a graphics adapter 762. In one embodiment, the bus comprises a PCI bus. The south bridge 726 may also provide a system management bus 764 for use in managing the various components of the computer 702. Additional details regarding the operation of the system management bus 764 and its connected components are provided below.

The south bridge 726 is also operative to provide one or more interfaces for connecting mass storage devices to the computer 702. For instance, according to an embodiment, the south bridge 726 includes a serial advanced technology attachment ("SATA") adapter for providing one or more SATA ports 736 and an ATA 100 adapter for providing one or more ATA 100 ports 744. The SATA ports 736 and the ATA 100 ports 744 may be, in turn, connected to one or more mass storage devices such as the SATA disk drive 738 storing an operating system 740 and application programs.

As known to those skilled in the art, an operating system 740 comprises a set of programs that control operations of a computer and allocation of resources. An application program is software that runs on top of the operating system software, or other runtime environment, and uses computer resources to perform application specific tasks desired by the user. According to one embodiment of the invention, the operating system 740 comprises the LINUX operating system. According to another embodiment of the invention the operating system 740 comprises an operating system within the WINDOWS family of operating systems from MICROSOFT CORPORATION. According to another embodiment, the operating system 740 comprises the UNIX, LINUX, or SOLARIS operating system. It should be appreciated that other operating systems may also be utilized.

The mass storage devices connected to the south bridge 726, and their associated computer storage media, provide non-volatile storage for the computer 702. Although the description of computer storage media contained herein refers to a mass storage device, such as a hard disk or CD-ROM drive, it should be appreciated by those skilled in the art that computer storage media can be any available media that can be accessed by the computer 702.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer storage media such as a ROM or a flash memory such as a NVRAM 748 for storing the firmware 750 that includes program code containing the basic routines that help to start up the computer 702 and to transfer information between elements within the computer 702.

As described briefly above, the south bridge 726 may include a system management bus 764. The system management bus 764 may include a BMC 766. The BMC 766 may be the BMC 102. In general, the BMC 766 is a microcontroller that monitors operation of the computer system 702. In a more specific embodiment, the BMC 766 monitors health-related aspects associated with the computer system 702, such as, but not limited to, the temperature of one or more components of the computer system 702, speed of rotational components (e.g., spindle motor, CPU Fan, etc.) within the system, the voltage across or applied to one or more components within the system 702, and the available or used capacity of memory devices within the system 702. To accomplish these monitoring functions, the BMC 766 is communicatively connected to one or more components by way of the management bus 764. In an embodiment, these components include sensor devices 768 for measuring various operating and performance-related parameters within the computer system 702. The sensor devices 768 may be either hardware or software based components configured or programmed to measure or detect one or more of the various operating and performance-related parameters.

It should also be appreciated that the computer 702 may comprise other types of computing devices, including handheld computers, embedded computer systems, personal digital assistants, and other types of computing devices known to those skilled in the art. It is also contemplated that the computer 702 may not include all of the components shown in FIG. 7, may include other components that are not explicitly shown in FIG. 7, or may utilize an architecture completely different than that shown in FIG. 7.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
receiving, at a first embedded-system device of the computer system, a first message instructing the first embedded-system device to make configurations of the first embedded-system device available at a location in a network, the first embedded-system device being a first base board management controller (BMC);
making, by the first embedded-system device, the configurations available at the location;
receiving, at a second embedded-system device of the computer system, a second message instructing the second embedded-system device to retrieve a subset of the configurations at the location, the second embedded-system device being a second BMC;
obtaining, at the second embedded-system device of the computer system, the subset of the configurations from the location; and
restoring by the second embedded-system device with the subset of the configurations.

2. The method of claim 1, wherein the location is at a network storage device, wherein making the configurations available comprises:
connecting to the network storage device; and
sending the configurations to the location.

3. The method of claim 2, wherein the subset of the configurations is less than the configurations in entirety.

4. The method of claim 1, wherein the location is at a web server of the first embedded-system device, wherein making the configurations available comprises:
  packaging the configurations in a data collection;
  placing the data collection on the web server of the first embedded-system device;
  receiving, at the web server of the first embedded-system device, a request to retrieve the data collection; and
  sending the data collection in response to the request.

5. The method of claim 4, wherein the obtaining the subset of the configurations comprises:
  receiving, at a web server of the second embedded-system device, a request to upload the data collection; and
  receiving, at the web server of the second embedded-system device, the data collection as an upload.

6. The method of claim 5, further comprising:
  receiving, at the second embedded-system device, a third message instructing the second embedded-system device to restore the second embedded-system device with the subset of the configurations; and
  locating the subset of the configurations from the data collection.

7. A computer system, comprising:
  a memory; and
  at least one processor coupled to the memory and configured to:
    receive, at a first embedded-system device of the computer system, a first message instructing the first embedded-system device to make configurations of the first embedded-system device available at a location in a network; the first embedded-system device being a first base board management controller (BMC);
    make, by the first embedded-system device, the configurations available at the location;
    receiving, at a second embedded-system device of the computer system, a second message instructing the second embedded-system device to retrieve a subset of the configurations at the location, the second embedded-system device being a second BMC;
    obtain, at the second embedded-system device of the computer system, the subset of the configurations from the location; and
    restore by the second embedded-system device with the subset of the configurations.

8. The computer system of claim 7, wherein the location is at a network storage device, wherein to make the configurations available, the at least one processor is further configured to:
  connect to the network storage device; and
  send the configurations to the location.

9. The computer system of claim 8, wherein the subset of the configurations is less than the configurations in entirety.

10. The computer system of claim 7, wherein the location is at a web server of the first embedded-system device, wherein to make the configurations available, the at least one processor is further configured to:
  package the configurations in a data collection;
  place the data collection on the web server of the first embedded-system device;
  receive, at the web server of the first embedded-system device, a request to retrieve the data collection; and
  send the data collection in response to the request.

11. The computer system of claim 10, wherein to obtain the subset of the configurations, the at least one processor is further configured to:
  receive, at a web server of the second embedded-system device, a request to upload the data collection; and
  receive, at the web server of the second embedded-system device, the data collection as an upload.

12. The computer system of claim 11, wherein the at least one processor is further configured to:
  receive, at the second embedded-system device, a third message instructing the second embedded-system device to restore the second embedded-system device with the subset of the configurations; and
  locate the subset of the configurations from the data collection.

13. A non-transitory computer-readable medium storing computer executable code for operating a computer system, comprising code to:
  receive, at a first embedded-system device of the computer system, a first message instructing the first embedded-system device to make configurations of the first embedded-system device available at a location in a network, the first embedded-system device being a first base board management controller (BMC);
  make, by the first embedded-system device, the configurations available at the location;
  receiving, at a second embedded-system device of the computer system, a second message instructing the second embedded-system device to retrieve a subset of the configurations at the location, the second embedded-system device being a second BMC;
  obtain, at the second embedded-system device of the computer system, the subset of the configurations from the location; and
  restore by the second embedded-system device with the subset of the configurations.

14. The non-transitory computer-readable medium of claim 13, wherein the location is at a network storage device, wherein to make the configurations available, the code is further configured to:
  connect to the network storage device; and
  send the configurations to the location.

15. The non-transitory computer-readable medium of claim 14, wherein the subset of the configurations is less than the configurations in entirety.

16. The non-transitory computer-readable medium of claim 13, wherein the location is at a web server of the first embedded-system device, wherein to make the configurations available, the code is further configured to:
  package the configurations in a data collection;
  place the data collection on the web server of the first embedded-system device;
  receive, at the web server of the first embedded-system device, a request to retrieve the data collection; and
  send the data collection in response to the request.

17. The non-transitory computer-readable medium of claim 16, wherein to obtain the subset of the configurations, the code is further configured to:
  receive, at a web server of the second embedded-system device, a request to upload the data collection;
  receive, at the web server of the second embedded-system device, the data collection as an upload;
  receive, at the second embedded-system device, a third message instructing the second embedded-system device to restore the second embedded-system device with the subset of the configurations; and
  locate the subset of the configurations from the data collection.

* * * * *